March 3, 1953

W. M. WALLIS 2,630,110

FLOOR FURNACE HAVING A DOWNWARDLY
DIRECTED HEATING FLAME
Filed May 16, 1949

WALTER M. WALLIS
Inventor

By Smith & Tuck

Attorneys

UNITED STATES PATENT OFFICE 2,630,110

FLOOR FURNACE HAVING A DOWNWARDLY DIRECTED HEATING FLAME

Walter M. Wallis, Seattle, Wash., assignor to United Air Heaters, Inc., Seattle, Wash., a corporation of Washington Application May 16, 1949, Serial No. 93,536

2 Claims. (Cl. 126—116)

My present invention relates to the general type of home heating furnaces referred to as floor furnaces, in that they are installed below the floor and have a register at their tops which forms a part of the floor. In order to overcome many of the shortcomings noted in furnaces of this general type, I provide that my fuel-burning equipment is disposed immediately below the grill, so that it will be convenient for lighting, servicing, repair or removal and will be so arranged that the heating flame is directed downwardly. Further, in order that the maximum amount of heat may be recovered from the fuel, I have provided a baffle arrangement which delays the passage of the products of combustion through the furnace and permits the recovery of the maximum amount of heat and if desired, may be used to draw cold air from a room removed from the furnace.

The type of design which has been used in an effort to produce a very economical construction in a floor furnace may be likened to the oil circulating heaters and those of that order in which the heat generating element is in the lower portion of the stove and then by connection and by the draft of the chimney, the products of combustion are led through a heat exchanging device, usually of the order of a drum, and the products of combustion then pass out through the chimney, giving a relatively low heat recovery efficiency. Such a type of furnace, when installed under the floor, makes it necessary normally to excavate under the house, so that the burner unit, disposed at the bottom of the furnace, may be serviced and repaired from below the floor. This has always been objectionable in that the cost of installation of some of these inexpensive floor furnaces, many times exceeds their own initial cost, and the device, therefore, is unsound economically because the floor furnace is normally employed as a means of getting heat at the minimum of initial outlay. There are other disadvantages of this general type, whether the unit directs the flame upwardly or horizontally, in that normally the surface which receives the maximum heat is the upper plate of the combustion chamber and this, to a degree, by direct convection, but largely by radiating heat in the form of radiant energy, throws so much heat upon the floor grill that it becomes objectionably hot and in many cases dangerous in homes, especially where infants are apt to crawl onto the grill.

The conventional floor furnace has numerous other objectionable features. Normally, in order to save expense in initial installation, burners of the pot or vaporizing type must be manually ignited and this normally means lifting up a portion of the floor grill and reaching well down into the pot or in many cases requires ignition from below the floor level, which again calls for expensive excavation. Another very critical objection to the conventional floor furnace, however, is that its working parts—the vaporizing mechanism, the burner and the electric motors that are used incidental to the same—are disposed at a low level and in areas where the water table is high, many times during the wet season, the furnaces are completely inoperative and in many instances essential elements are often damaged beyond repair.

The principal object of my present invention, therefore, is to overcome the objections to the conventional type of floor furnace and to so construct the unit that a very high degree of heat conversion efficiency is provided.

A further object of my invention is to provide a floor type furnace which can be easily and conveniently lighted or serviced from the living quarters of the home.

A further object is to provide means whereby the burner and control elements of my furnace can be easily removed from the living quarters with a very minimum of labor and without the necessity of ever crawling under the house during the removal, servicing or repair of the burner and its controls.

A further object of my invention is to provide a vaporizing type of floor furnace in which an overall heat conversion efficiency of approximately eighty percent can be obtained.

A further object of my invention is to provide a floor furnace in which the hottest part of the body is at the bottom of the unit, where the incoming cold air first meets this hot plate.

A further object of my invention is to provide a floor furnace in which the radiant heat from the top is reduced to a minimum, so that the floor grill temperatures are uniform over the entire surface of the grill and never become excessively hot.

A further object is to provide that none of the fuel-handling equipment is in the circulated air stream, excepting the fan motor which is positioned in the air stream of the cold air for cooling purposes.

A further object is the provision of means for drawing cold air from a distant room and introducing it into the heating zone of the furnace.

Further objects, advantages and capabilities will be apparent from the description and disclosure in the drawings, or may be comprehended or are inherent in the device.

Figure 1:
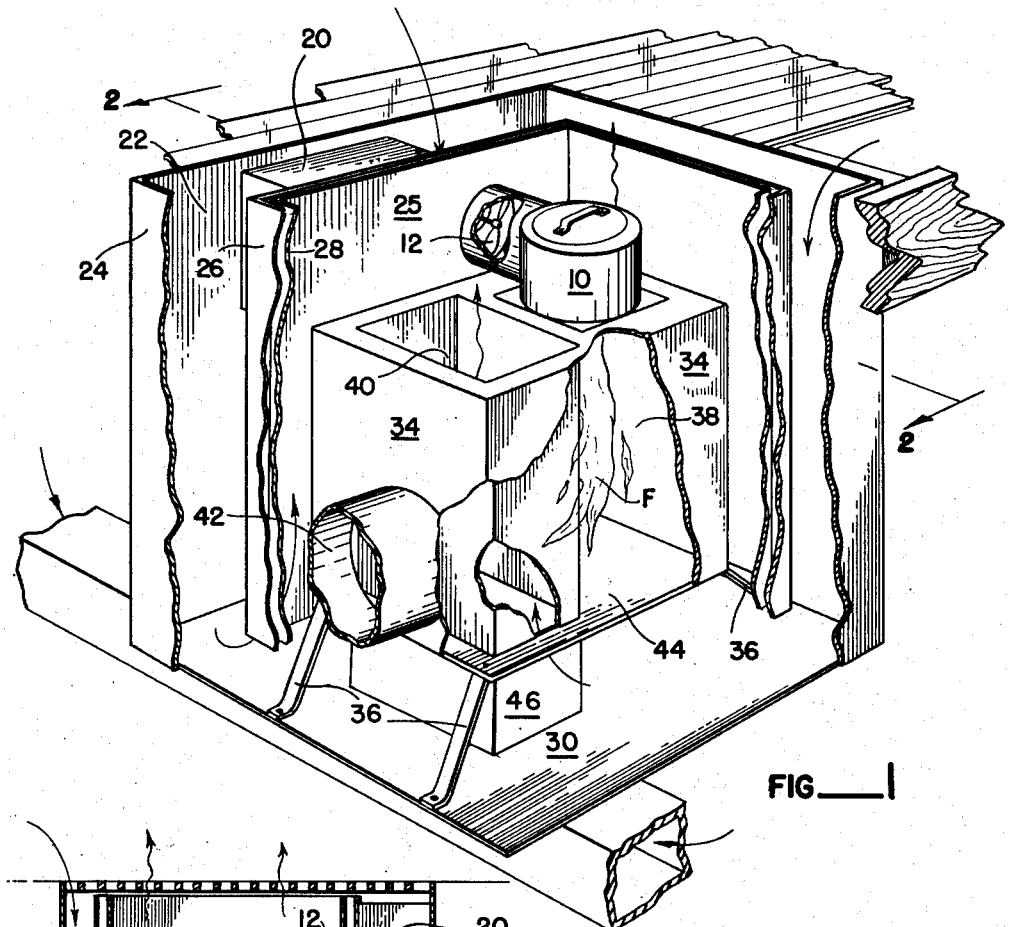
Figure 1 is a perspective view showing a furnace made after the teaching of my present invention.
Figure 2:
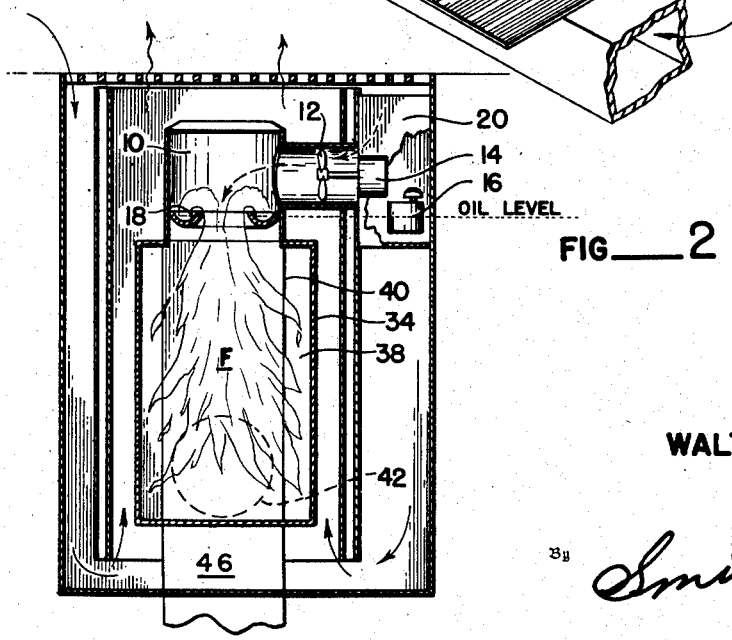
Figure 2 is a vertical cross sectional view through my furnace, taken along the plane of line 2—2 of Figure 1, especially to illustrate the impingement of the heating flame and the circulation of the heating air therethrough.

Referring more particularly to the disclosure in the drawings, the numeral 10 designates the burner element as it will appear when liquid hydrocarbons, such as diesel oil, kerosene and the like are used for fuel. It will be apparent, it is believed, that if the gaseous hydrocarbons are used, a suitable type of flame producer would be substituted for the vaporizing pot type burner 10. The combustion air is supplied by fan 12, which in turn is driven by a suitable electric motor 14. The oil level in the burner corresponds substantially to that indicated in Figure 2 and is controlled by a constant level control 16. There are many styles of these elements. However, they are normally characterized by having float means, so that the oil level is maintained at a definite elevation and this elevation should correspond to the overflow point, as 18 of burner 10. Attention is invited to the fact that the constant level control is enclosed in a separate housing 20 which also forms an oil reservoir, and the fan motor 14 preferably is positioned in the cold air supply duct, as 22, which, it will be noted, surrounds the furnace preferably on all four sides. This is a matter of safety, in that it keeps the outside of the furnace cool and also from an operational standpoint, it draws the cold air off the floors down into the furnace for reheating. The outer wall 24, which forms one wall of passageway 22 and the outer casing of the furnace, is preferably of sheet metal for safety reasons particularly. Peripheral supporting means may be provided, for the furnace, near the top of wall 24.

The inner wall of passage 22 is formed by the inner casing 25 which is normally formed by having a double wall construction as 26 and 28. The double wall construction has proved to provide a substantial measure of safety and it prevents radiant energy from being projected out and raising the temperature of wall 24 to an unsafe degree.

The double wall structure, 25, is in effect just four sides, and is open at the top and at the bottom. It will be noted that the outer sheeting, wall 24, is provided with the metal bottom 30, and is the enclosing element for the entire furnace and under certain conditions may form the support for the furnace. The incoming air, as it passes down through passageway 22, which extends around the furnace, goes down to a point where it can pass under the elevated bottom of the wall formed by the spaced sheets 26 and 28. These sheets form reflective barriers for the heat of the firebox and the relatively small amount of air rising upwardly between the plates carries off accumulated heat.

Disposed substantially centrally with respect to the enclosing walls of the sheathing or outside casing 24, is the combustion chamber and heat exchanger unit 34. This unit is preferably supported above the surface of bottom 30 by a plurality of legs 36. One end of unit 34 comprises the firebox or combustion chamber 38, into which the flame from burner 10 is projected downwardly. This action is probably best illustrated in Figure 2. At its opposite end, unit 34 is provided with a through tube, or baffle, vertically disposed, which permits heating air to flow entirely through the same, it being joined to casing 34 at the top and bottom. This provides a restricted passageway on three of its sides and the flame F and the products of combustion, are forced to detour or circulate around passageway 40 and to finally then be expelled out through the chimney stack connection 42.

It is to be noted that in carrying out the object of this invention, flame F is directed downwardly, so that the point of greatest heat is the bottom plate 44 of unit 34. This plate is ideally positioned as the hot member of the furnace, in that it is the furthest possible away from the floor grill that covers the furnace and it first meets the incoming cold air. This latter fact greatly assists the heat transfer to the incoming air and it effectively prevents radiation from this hot plate to the over-covering grill, which in the past has been a very serious fault and point of danger with the ordinary floor furnace.

It is to be noted that the flue or baffle member 40 is relatively large in comparison with the size of the furnace proper and this provides a relatively thin passageway for the flow of the products of combustion. At the same time, the very substantial area of the inner surface of duct 40, adds a great deal to the radiating or wiping surface of the firebox. A secondary function of this large baffle is to slow down the exit of the products of combustion, give them a chance to wipe the cool surfaces and make an effective transfer of their heat to the air being heated. This factor contributes to a large degree to the relatively high efficiency of this form of furnace. It has been found by trial that furnaces built after the teachings of this present invention, can be expected to show a heating efficiency of eighty percent or better. This is very high in comparison with the usual type of pot burner installations.

It is believed that it will be clearly apparent from the above description and the disclosure in the drawings that the invention comprehends a novel construction of a floor furnace having a downwardly directed heating flame.

A very worthwhile feature of my furnace is the cold air return duct 46. This duct may be connected to any remote area where cold air tends to accumulate and by the removal of same the circulation of heated air will be assisted. Duct 46 passes through plate 30 and enters the flue or baffle passageway 40. As the air in flue 40 is heated it tends to rise and to draw replacement air from duct 46. Further, as a large volume of heated air is passing upwardly around flue 40, a syphon action is created which also assists in drawing cold air through duct 46.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

Having thus disclosed the invention, I claim:

1. A floor furnace of the type adapted to be installed below a floor, consisting of: a floor level grill; a flame producing burner for hydrocarbons positioned immediately below said grill; means forming a rectangular combustion chamber adapted to support said burner above said chamber and to form a heat exchanger for heating air; a large baffle flue passing through said combustion chamber from top to bottom at one end thereof and of sufficient relative size to provide restricted passageways in said combustion chamber on three sides of said baffle flue; said burner being disposed to direct its flame downwardly into said combustion chamber at one side of said baffle flue and cause the products of combustion to pass through said restricted passageway and there being a chimney stack connection at the opposite side of said baffle flue adjacent the bottom of said combustion chamber; a double walled inner casing enclosing said combustion chamber on four sides and substantially uniformly spaced therefrom to form a heated air passageway; an outer casing surrounding said inner casing and substantially uniformly spaced therefrom to form a cold air passageway; a bottom plate closing the bottom of said outer casing and displaced below the inner casing sufficient distance to operatively connect said cold and heated air passageways; a cold air supply duct adapted to pass through said bottom plate and operatively connect with the bottom of said baffle flue passing through said combustion chamber; an air supply fan disposed to direct air into the side of said burner; an electric motor for said fan disposed in said cold air passageway; and constant level control means for said burner and an enclosing housing for the same positioned between said inner and outer casings and at approximately the same level as said burner.

2. A floor furnace of the type adapted to be installed below a floor, comprising: a floor level grill; a flame producing burner for hydrocarbons positioned immediately below said grill; means forming a combustion chamber adapted to support said burner above said chamber and to form a heat exchanger for heating air; said combustion chamber being elongated horizontally in one direction and a large baffle flue passing through said combustion chamber from top to bottom at one end thereof and of sufficient relative size to provide restricted passageways in said combustion chamber on three sides of said baffle flue; said burner being disposed to direct the flame downwardly into said combustion chamber at one side of said baffle flue and to cause the products of combustion to pass through said restricted passageways; there being a chimney stack connection at the opposite side of said baffle flue from said burner and adjacent the bottom of said combustion chamber; an inner casing enclosing said combustion chamber on four sides and spaced therefrom to form a heated air passageway; an outer casing surrounding said inner casing and spaced therefrom to form a cold air passageway; a bottom plate closing the bottom of said outer casing and displaced below the inner casing sufficient distance to operatively connect said cold and heated air passageways; a cold air supply duct operatively connected to the bottom of said baffle flue; an air supply fan disposed to direct air into the side of said burner; an electric motor for said fan; and constant level control means for said burner and an enclosing housing for the same positioned between said inner and outer casings and at approximately the same level as said burner.

WALTER M. WALLIS.

REFERENCES CITED

The following references are of record in the file of this patent:

UNITED STATES PATENTS

| Number | Name | Date |
| --- | --- | --- |
| 463,186 | Daw | Nov. 17, 1891 |
| 1,259,985 | Holmes et al. | Mar. 19, 1918 |
| 1,527,233 | Stafford | Feb. 24, 1925 |
| 1,726,293 | Gravelle et al. | Aug. 27, 1929 |
| 2,401,330 | Breese | June 4, 1946 |
| 2,418,709 | Hayter | Apr. 8, 1947 |
| 2,475,737 | Campbell | July 12, 1949 |
| 2,543,033 | Little | Feb. 27, 1951 |
| 2,581,145 | Roberts | Jan. 1, 1952 |